United States Patent

Mashitani et al.

[11] Patent Number: 5,663,831
[45] Date of Patent: Sep. 2, 1997

[54] THREE-DIMENSIONAL DISPLAY

[75] Inventors: Ken Mashitani, Nara-ken; Goro Hamagishi, Osaka-fu; Daisuke Takemori, Osaka-fu; Hideyuki Kanayama, Osaka-fu; Kazuhiro Arai, Osaka-fu, all of Japan

[73] Assignee: Sanyo Electric Co., Ltd., Moriguchi, Japan

[21] Appl. No.: 392,156

[22] Filed: Feb. 22, 1995

[30] Foreign Application Priority Data

Feb. 23, 1994 [JP] Japan .................. 6-025116
May 19, 1994 [JP] Japan .................. 6-105800

[51] Int. Cl.[6] ............................................. G02B 27/22
[52] U.S. Cl. .................... 359/463; 359/462; 359/466; 348/59; 353/7
[58] Field of Search .......................... 359/462, 463, 359/466; 348/51, 54, 59; 353/7; 352/57, 58, 60, 61, 86

[56] References Cited

U.S. PATENT DOCUMENTS

| 2,307,276 | 1/1943 | Keyzer | 352/58 |
| 3,101,644 | 8/1963 | Lopez-Henriquez | 352/86 |
| 5,349,379 | 9/1994 | Eichenlaub | 348/59 |
| 5,410,345 | 4/1995 | Eichenlaub | 348/59 |
| 5,465,175 | 11/1995 | Woodgate et al. | 359/463 |

OTHER PUBLICATIONS

Japanese Abstract, Laid-Open Gazette No. 119889/1991.

*Primary Examiner*—Paul M. Dzierzynski
*Assistant Examiner*—Darren E. Schuberg
*Attorney, Agent, or Firm*—Nikaido, Marmelstein, Murray & Oram LLP

[57] ABSTRACT

The present invention provides a three-dimensional display comprising an LCD projector, a diffusing plate arranged on a surface on which an image projected by the LCD projector is formed, and a parallax barrier having slits in the shape of vertical stripes which is arranged on the side of a viewer with respect to the diffusing plate, wherein a lenticular lens plate is arranged on the side of the LCD projector with respect to the diffusing plate, and an image having black portions each having a larger rate of the width than that of a black matrix on the LCD projector is formed on the diffusing plate without decreasing brightness by the function of respective lenses constituting the lenticular lens plate, thereby to increase the ratio of each of the slits of the parallax barrier at which there is no crosstalk region.

11 Claims, 9 Drawing Sheets

THREE-DIMENSIONAL DISPLAY

BACKGROUND OF THE INVENTION

1. Field of the Invention

The present invention relates generally to three-dimensional displays, and more particularly, to a three-dimensional display so adapted that a crosstalk region can be reduced to zero without decreasing brightness.

2. Description of the Prior Art

Typical examples of a three-dimensional display without glasses include a three-dimensional display by a parallax barrier method. In the three-dimensional display, a right eye image and a left eye image which are projected from an image projector such as an LCD (Liquid Crystal Display) projector are formed on a diffusing plate, and the formed images are viewed through a parallax barrier.

As shown in FIG. 14, right eye pixels R and left eye pixels L are alternately formed with portions where no image exists which is referred to as black portions 34 interposed therebetween on a diffusing plate 21, and each of the right eye pixels R is viewed with the right eye of a viewer and at the same time, each of the left eye pixels L is viewed with the left eye thereof through one of slits of a parallax barrier 22 arranged on the side of the viewer with respect to the diffusing plate 21, thereby to make it possible to view a three-dimensional image.

As shown in FIG. 15, a range 31 in which the right eye pixel R can be viewed and a range 32 in which the left eye pixel L can be viewed through one of the slits of the parallax barrier 22 are partially overlapped with each other. A range in which the right eye pixel R and the left eye pixel L can be viewed is referred to as a crosstalk region 33. If the eyes of the viewer enter the crosstalk region 33, it is impossible to view a three-dimensional image.

Since the crosstalk region 33 restricts the range of the lateral movement of the eyes which can view a three-dimensional image, it is preferable that there is no crosstalk region 33.

In order to reduce the crosstalk region 33 to zero, the range 31 in which the right eye pixel R can be viewed and the range 32 in which the left eye pixel L can be viewed in the position of the eyes of the viewer may be continuous without being overlapped with each other by making the width of the slit of the parallax barrier 22 smaller than that of the black portion 34.

In this three-dimensional display by a parallax barrier method, brightness per one pixel viewed is represented by $\ell \cdot x/w$ letting $\ell$ be the brightness of one pixel on the diffusing plate 21, x be a region where the eyes view a pixel aperture through the parallax barrier 22, and w be the width of the pixel aperture on the diffusing plate 21, as shown in FIG. 17.

If the width of the slit of the parallax barrier 22 is decreased so as to reduce the crosstalk region 33 to zero, x becomes small, whereby it is clear that the brightness per one pixel viewed is decreased.

In this three-dimensional display by a parallax barrier method, the change in brightness in a case where the viewer is moved rightward and leftward is such a change that in ranges 62 and 63 on the right and left sides centered with respect to a range 61 in which the maximum brightness $\ell$ is obtained, the brightness is gradually decreased as the viewer separates from the center, as shown in FIG. 18, because the width of each of the slits of the parallax barrier 22 is generally made larger than the width of each of the pixels R and L. In this case, the smaller the width of each of the pixels on the diffusing plate 21 is, the larger the range 61 is, and the smaller each of the ranges 62 and 63 is. If the viewer moves rightward and leftward, therefore, the brightness is less changed. As can be seen from the foregoing, if sufficiently high brightness is obtained even if the ratio of each of pixel apertures is low in the parallax barrier method, it is the most suitable condition under which a three-dimensional image is viewed that the width of each of the black portions 34 on the diffusing plate 21 is as large as possible in the design in which there is no crosstalk region as shown in FIG. 16.

If an LCD projector is used as an image projector, however, the rate of the width of each of the black portions 34 of an image formed on the diffusing plate 21 corresponds to the rate of the width of a black matrix on an LCD panel in the LCD projector. If the width of each of the slits of the parallax barrier 22 is made smaller than that of each of the black portions 34 so as to reduce the crosstalk region 33 to zero, therefore, the ratio of the slit of the parallax barrier 22 is significantly reduced, whereby the utilization efficiency of light from a light source in the LCD projector is reduced.

It is considered that the ratio of each of the slits of the parallax barrier 22 is set to a value of not less than a predetermined value, and the width of each of the black portions 34 of the image formed on the diffusing plate is made larger than the width of each of the slits of the parallax barrier 22, thereby to reduce the crosstalk region 33 to zero.

Therefore, the rate of the width of each of the black portions 34 of the image formed on the diffusing plate must be larger than the rate of the width of the black matrix on the LCD panel. In order to increase the width of each of the black portions 34, some methods are considered. For example, the ratio of each of pixel apertures on the LCD panel is reduced, and black stripes are formed on the diffusing plate.

However, the methods are methods for intercepting light from the light source in the image projector. If the methods of intercepting light are used, therefore, the utilization efficiency of the light from the light source in the image projector is reduced, whereby the maximum brightness per one pixel which can be viewed is decreased.

In the prior art, therefore, the width of each of the black portions on the diffusing plate cannot be increased while maintaining sufficiently high brightness, whereby the most suitable condition under which a three-dimensional image is viewed in the parallax barrier method cannot be satisfied.

SUMMARY OF THE INVENTION

In view of the foregoing circumstances, an object of the present invention is to provide a three-dimensional display so adapted that a crosstalk region is reduced to zero without decreasing brightness, and the most suitable condition under which a three-dimensional image is viewed in a parallax barrier method can be satisfied.

In order to attain the above described object, a three-dimensional display according to the present invention comprises an image projector, a diffusing plate arranged on a surface on which an image projected by the image projector is formed, a parallax barrier having slits in the shape of vertical stripes which is arranged on the side of a viewer with respect to the diffusing plate, and a lenticular lens plate arranged on the side of the image projector with respect to the diffusing plate.

Furthermore, it is preferable to provide black stripes having apertures with predetermined spacing formed therebetween at an equal pitch on the diffusing plate.

In the present invention, the lenticular lens plate is a plate constituted by a lot of continuous semicylindrical lenses arranged parallel to each other, and an image projected by the image projector is formed in the shape of vertical stripes with black portions therebetween on the diffusing plate by the refraction function of the respective lenses constituting the lenticular lens plate.

The rate of the width of each of the black portions of the image on the diffusing plate in this case can be made larger than the rate of the width of a black matrix on the image projector by optimizing parameters such as the distance between the lenticular lens plate and the diffusing plate, the projection distance, the diameter of a projection lens, a pitch between the lenses constituting the lenticular lens plate, and the radius of curvature of lenses. In addition, the most suitable condition under which a three-dimensional image is viewed in the parallax barrier method can be satisfied when the aperture ratio of each of the slits of the parallax barrier is made the largest by optimizing the above described parameters.

Moreover, light emitted from each of pixel apertures on the image projector is not intercepted and is converged on the diffusing plate by the effect of the lenses constituting the lenticular lens plate. Accordingly, the utilization efficiency of the light from a light source in the image projector is not reduced, whereby the brightness is not decreased.

As a result, the upper limit of the aperture ratio of each of the slits of the parallax barrier at which there is no crosstalk region can be increased, thereby to make it possible to reduce the crosstalk region to zero without decreasing the brightness.

Furthermore, the widths of the pixels on the diffusing plate become constant irrespective of the position of the pixel by providing the black stripes having apertures with predetermined spacing formed therebetween at an equal pitch on the diffusing plate, whereby the parallax barrier for separating an image is further optimized.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a perspective view showing the construction of a three-dimensional display according to a fourth embodiment of the present invention;

DESCRIPTION OF THE PREFERRED EMBODIMENTS

A three-dimensional display according to a first embodiment of the present invention will be specifically described on the basis of drawings.

Figure 1:
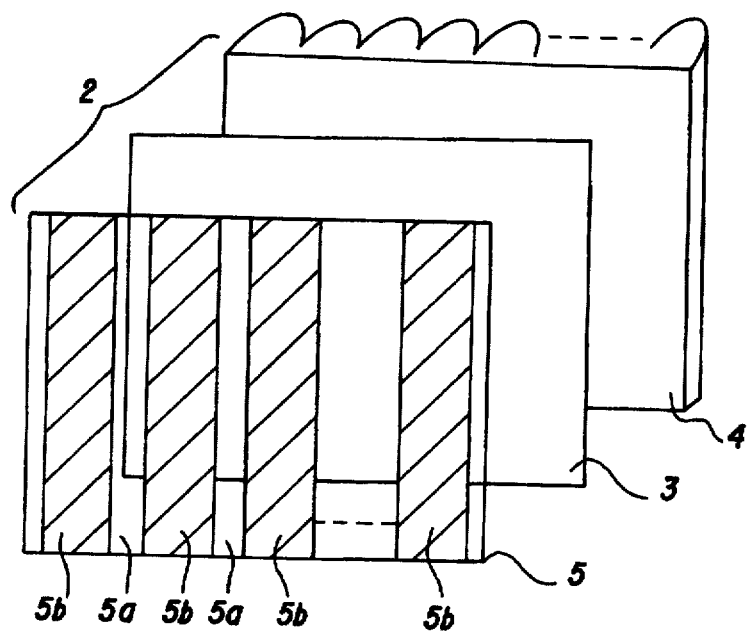
FIG. 1 is a perspective view showing the construction of a screen according to a first embodiment of the present invention.
Figure 2:
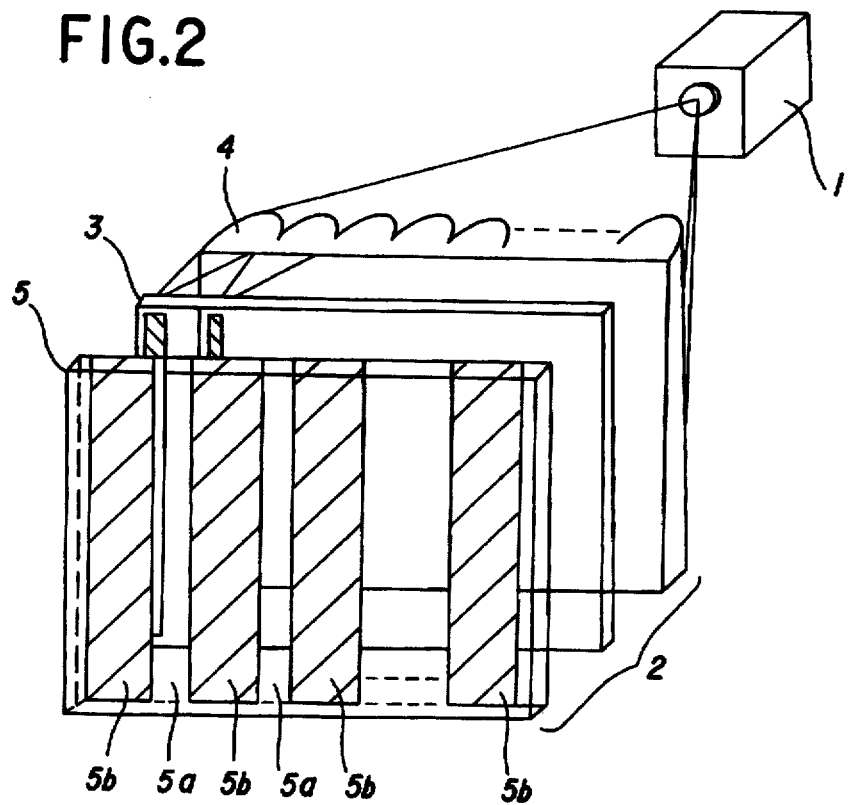
FIG. 2 is a perspective view showing the construction of a three-dimensional display according to the first embodiment of the present invention.

As shown in FIG. 2, a three-dimensional display without glasses according to the first embodiment of the present invention comprises an LCD projector 1 serving as an image projector and a screen 2. The screen 2 comprises a diffusing plate 3 arranged on a surface on which an image projected by the image projector 1 is formed, a lenticular lens plate 4 arranged on the side of the LCD projector 1 with respect to the diffusing plate 3, and a parallax barrier 5 having slits 5a in the shape of vertical stripes which is arranged on the side of a viewer with respect to the diffusing plate 3, as shown in FIGS. 1 and 2.

Figure 3:
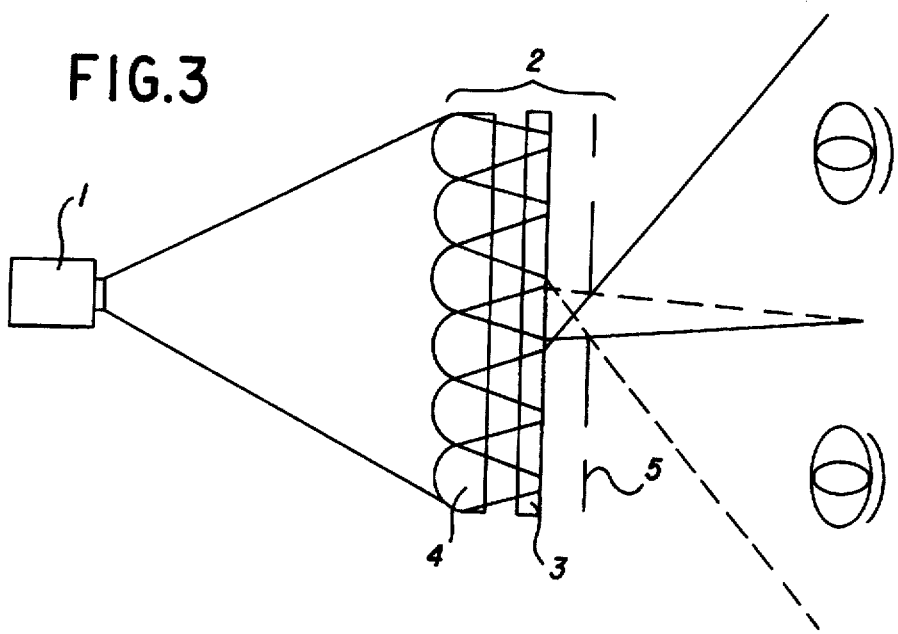
FIG. 3 is a schematic view showing the principle of the first embodiment of the present invention.

As shown in FIG. 3, an image projected by the LCD projector 1 is incident on the lenticular lens plate 4, and then is formed in the shape of vertical stripes on the diffusing plate 3. The image is viewed by a viewer through each of the slits 5a of the parallax barrier 5.

The lenticular lens plate 4 in the present invention is a plate constituted by a lot of continuous semicylindrical lenses arranged parallel to each other. The image projected by the LCD projector 1 is formed in the shape of vertical stripes on the diffusing plate 3 by the refraction function of the respective lenses constituting the lenticular lens plate 4.

Since each of the lenses constituting the lenticular lens plate 4 converges the image projected by the LCD projector 1 to form the image on the diffusing plate 3 in the shape of vertical stripes. If the lenticular lens plate 4 constituted by lenses having a one-to-one correspondence with pixels in the horizontal direction on the LCD projector 1, for example, is used, therefore, an image having black portions each having a larger rate of the width than that of a black matrix on the LCD projector 1 can be formed on the diffusing plate 3.

In other words, it is possible to form an image having black portions each having a required width on the diffusing plate 3 while increasing the ratio of each of pixel apertures on the LCD projector 1 to increase the utilization efficiency of light from a light source in the LCD projector 1.

Moreover, each of pixels on the diffusing plate 3 is formed by the convergence of light passing through each of the pixel apertures on the LCD projector 1 on the diffusing plate 3 by each of the lenses constituting the lenticular lens plate 4, whereby an image of sufficiently high brightness is formed on the diffusing plate 3 without reducing the utilization efficiency of the light from the light source in the LCD projector 1.

The above described parallax barrier 5 is slit at a smaller pitch than twice the pitch between the black portions of the image formed on the diffusing plate 3, and barrier stripes 5b having a lot of slits 5a each having a smaller width than the width of each of the black portions of the image formed on the diffusing plate 3 formed therebetween are formed on the parallax barrier 5. The parallax barrier 5 is arranged in the position in which the viewer at a predetermined distance from the screen 2 can view each of right eye pixels R and each of left eye pixels L corresponding to one of the slits 5a continuously without being overlapped with each other through the slit 5a with respect to the diffusing plate 3.

As a result, a three-dimensional image of sufficiently high brightness can be viewed without a crosstalk region, and the most suitable condition under which a three-dimensional image is viewed in a parallax barrier method can be satisfied.

Figure 4:
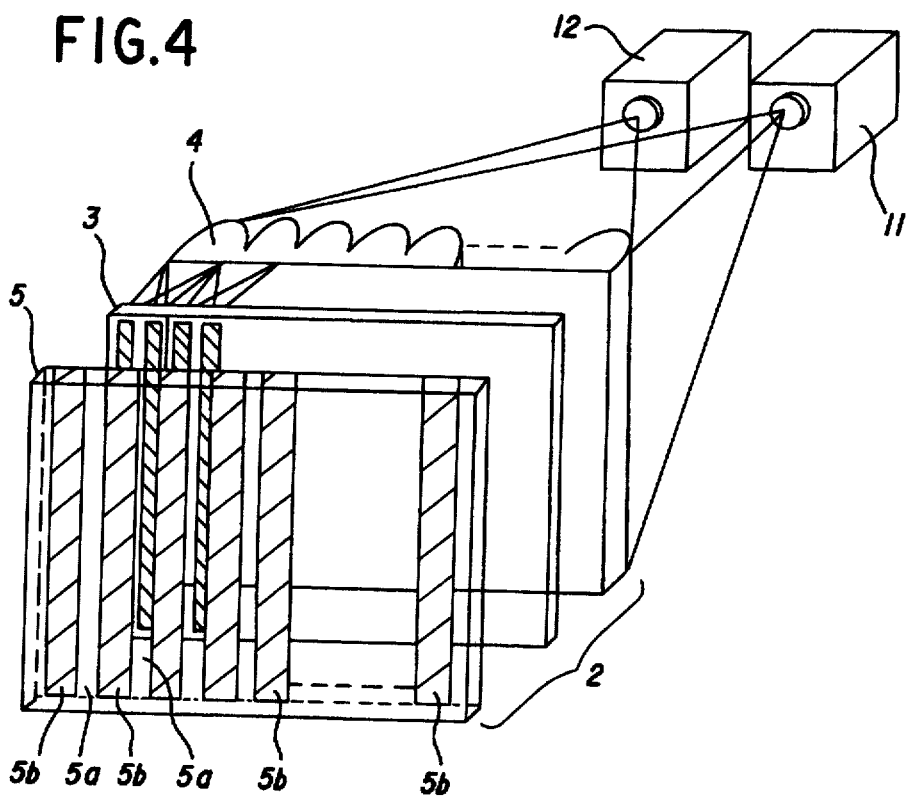
FIG. 4 is a schematic view showing the construction of a three-dimensional display according to a second embodiment of the present invention.
Figure 5:
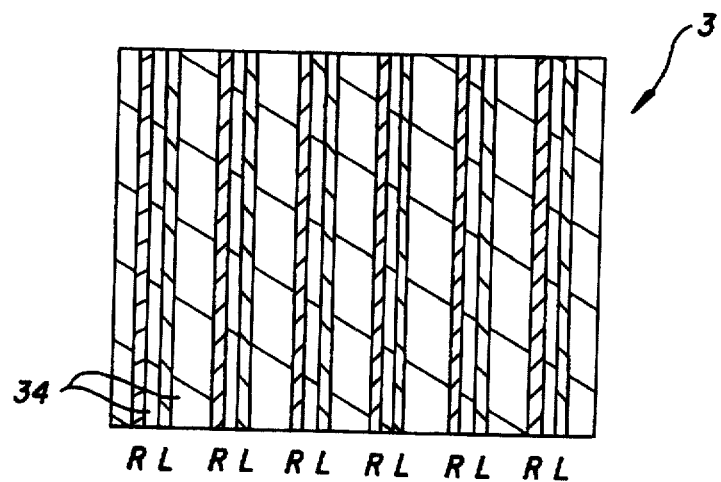
FIG. 5 is a schematic view for explaining an image on a diffusing plate in the second embodiment of the present invention.

In a second embodiment of the present invention shown in FIG. 4, there are provided an LCD projector dedicated to a right eye image 11 and an LCD projector dedicated to a left eye image 12. The same portions as those in the above described embodiment are assigned the same reference numerals and hence, the description thereof is not repeated so as to avoid the overlapping of the description.

In the present embodiment, pixels in the horizontal direction on each of the LCD projectors and lenses need not have a one-to-one correspondence with each other, whereby the adjustment of the position of the LCD projector is simplified.

Images are respectively projected onto a diffusing plate 3 from the LCD projectors 11 and 12 so that alternate black portions 34a among right eye pixels R and left eye pixels L on the diffusing plate 3 are wider than the other black portions 34b by suitably setting the arrangement of each of the LCD projectors 11 and 12.

The above described parallax barrier 5 is slit at a smaller pitch than the pitch between the right eye pixels or the left eye pixels which are formed on the diffusing plate 3, and barrier stripes 5b having a lot of slits each having a smaller width than the width of each of the black portions 34 formed therebetween are formed on the parallax barrier 5.

Figure 6:
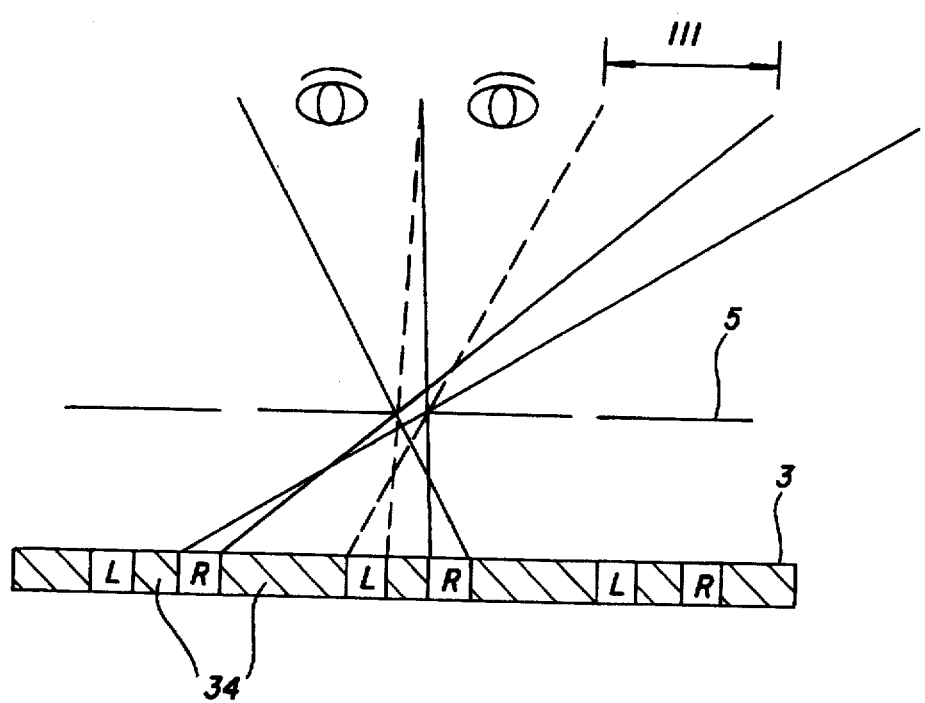
FIG. 6 is a schematic view showing the principle of the second embodiment of the present invention.

In this case, a region 111 where no image is viewed from a viewer can be formed, as shown in FIG. 6. If this region 111 is made larger than the distance between the eyes of the viewer, it is possible to eliminate the state of so-called reversed view where the viewer views a right eye image with the left eye and at the same time, views a left eye image with the right eye.

Figure 7:
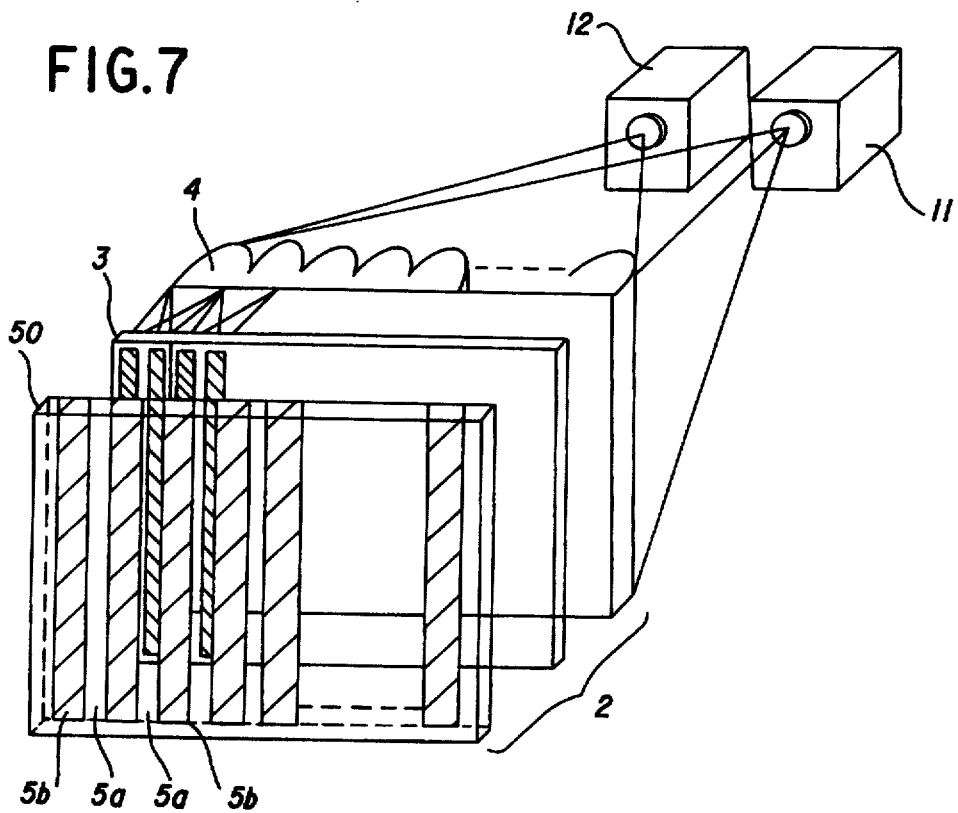
FIG. 7 is a perspective view showing the construction of a three-dimensional display according to a third embodiment of the present invention.

In a third embodiment of the present invention shown in FIG. 7, a parallax barrier 50 in which barrier stripes 5b are formed by electronic control is used as a parallax barrier. The same portions as those in the above described embodiments are assigned the same reference numerals and hence, the description thereof is not repeated so as to avoid the overlapping of the description.

The parallax barrier 50 is constructed using a transmission type liquid crystal element or the like. The barrier stripes having slits provided at a predetermined pitch and each having a predetermined width appear or disappear by ON/OFF of a voltage.

If the barrier strips 5b in the shape of vertical stripes are formed on the parallax barrier 50, as shown in FIG. 7, it is possible to view a three-dimensional image.

Figure 8:
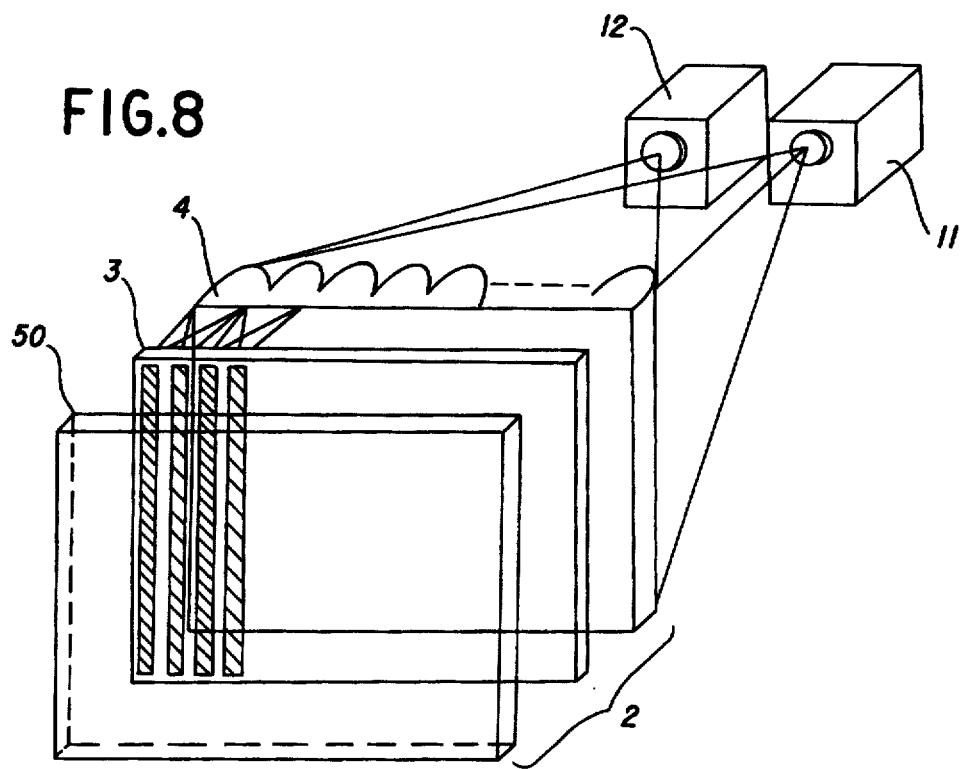
FIG. 8 is a perspective view showing the construction of the three-dimensional display according to the third embodiment of the present invention.

Furthermore, if the parallax barrier 50 is so controlled that the formation of the barrier strips 5b on the parallax barrier 50 is stopped, as shown in FIG. 8, the parallax barrier 50 enters a colorless and transparent state over the whole image display area. If the parallax barrier 50 is thus controlled, it is possible to also use the three-dimensional display as a two-dimensional display.

Figure 9:
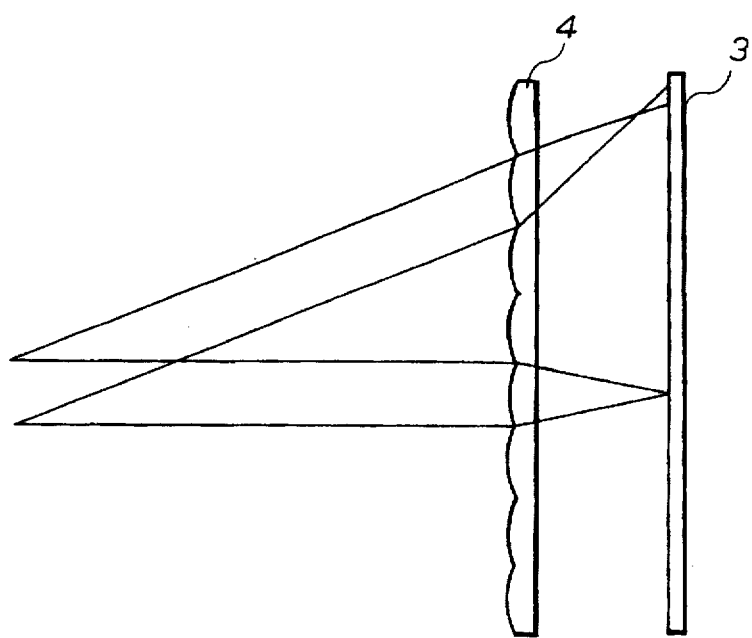
FIG. 9 is a schematic view for explaining the aberration of lenses constituting a lenticular lens plate in the present invention.
Figure 10:
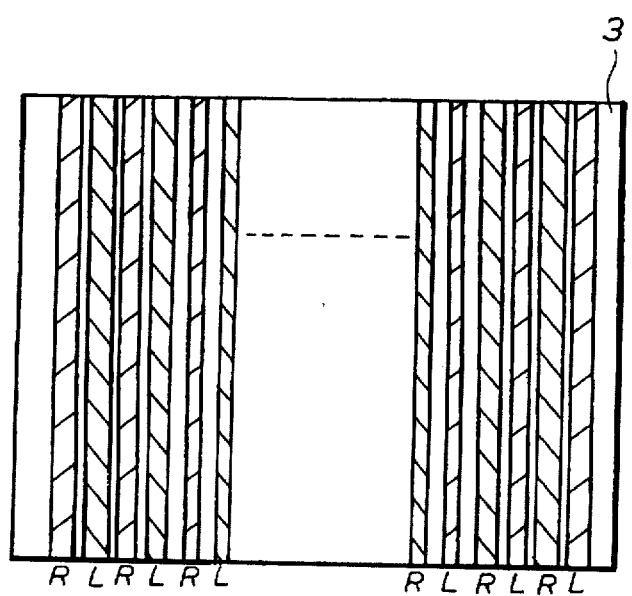
FIG. 10 is a schematic view showing the widths of pixels on the diffusing plate in the present invention.

In the above described embodiments, the lenticular lens plate 4 is located on the side of the projector with respect to the diffusing plate 3, thereby to decrease the width of each of the pixels on the diffusing plate 3, and the viewer views a three-dimensional image in the most suitable state through the parallax barrier 5 located on the side of the viewer with respect to the diffusing plate 3. As shown in FIG. 9, however, an image is so projected that the widths of the pixels differ in the center and an end of the diffusing plate 3 by the aberration of lenses constituting the lenticular lens plate 4. That is, as shown in FIG. 10, an image is projected on the diffusing plate 3 in a state where the width of the pixel in the end is larger than that of the pixel in the center.

A forth embodiment as described in the following aims at making the widths of pixels on a diffusing plate constant irrespective of the position of the pixel to optimize a parallax barrier for separating an image.

In the fourth embodiment of the present invention shown in FIG. 11, black strips 31 having apertures 32 with predetermined spacing formed therebetween are provided at an equal pitch on a diffusing plate 30. The same portions as those in the above described embodiments are assigned the same reference numerals and hence, the description thereof is not repeated so as to avoid the overlapping of the description.

Figure 12:
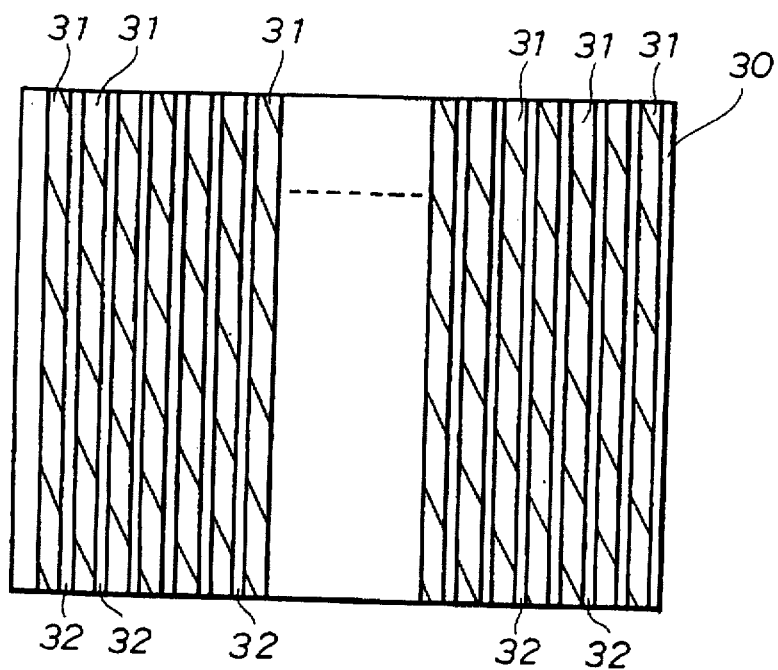
FIG. 12 is a schematic view showing a diffusing plate in the fourth embodiment of the present invention.

The diffusing plate 30 in the present embodiment is so arranged that the width of each of the apertures 32 is set to not more than the width of a pixel having the smallest width out of pixels on the diffusing plate 30, and all the apertures 32 are so arranged that they are not overlapped with the black stripes 31 on the diffusing plate 30, as shown in FIG. 12.

Figure 13:
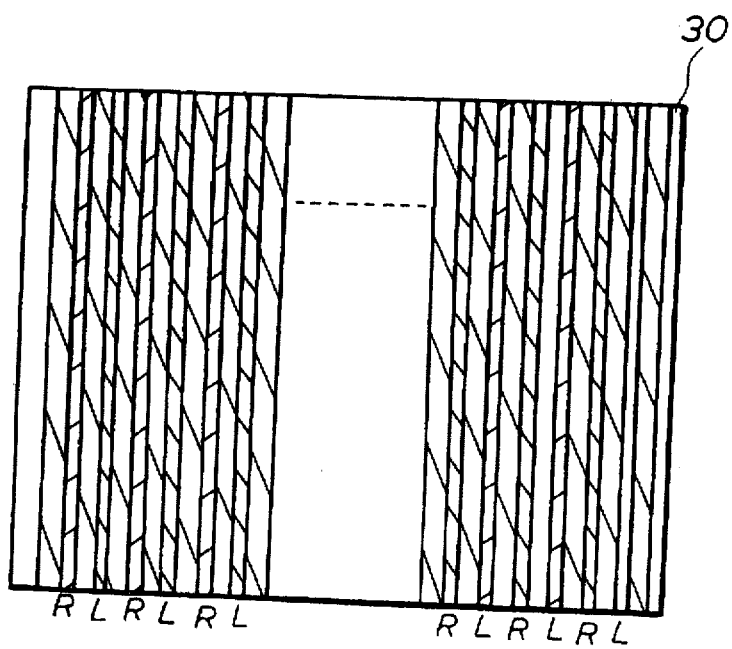
FIG. 13 is a schematic view showing the shapes of pixels on the diffusing plate in the fourth embodiment of the present invention.
Figure 14:
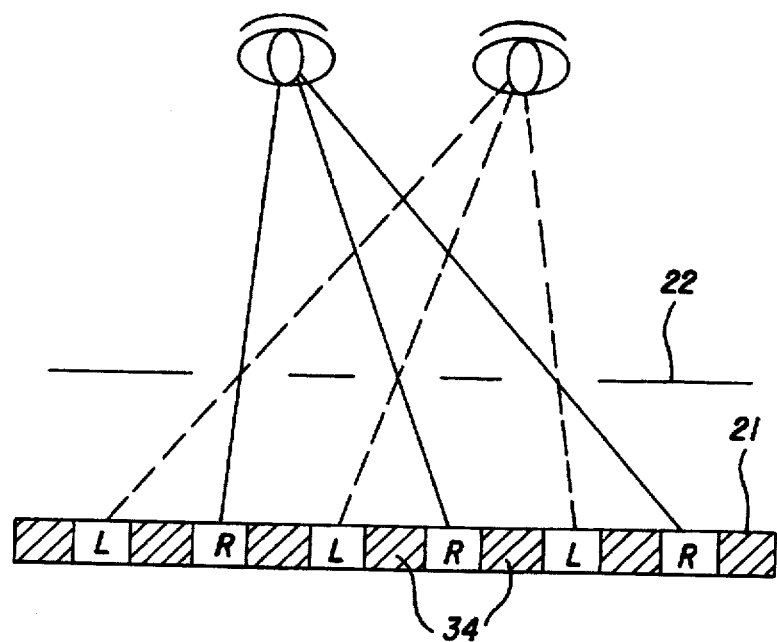
FIG. 14 is a schematic view showing the principle of a parallax barrier method.
Figure 15:
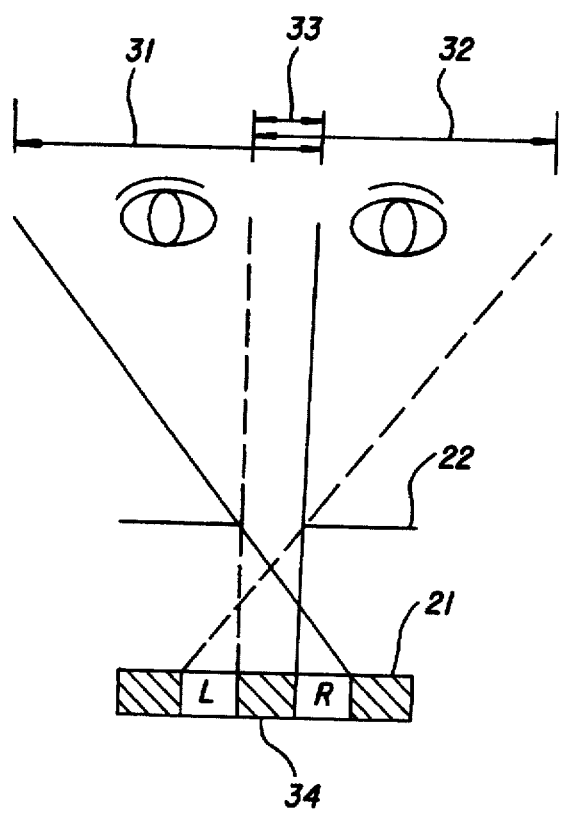
FIG. 15 is a schematic view for explaining a crosstalk region.
Figure 16:
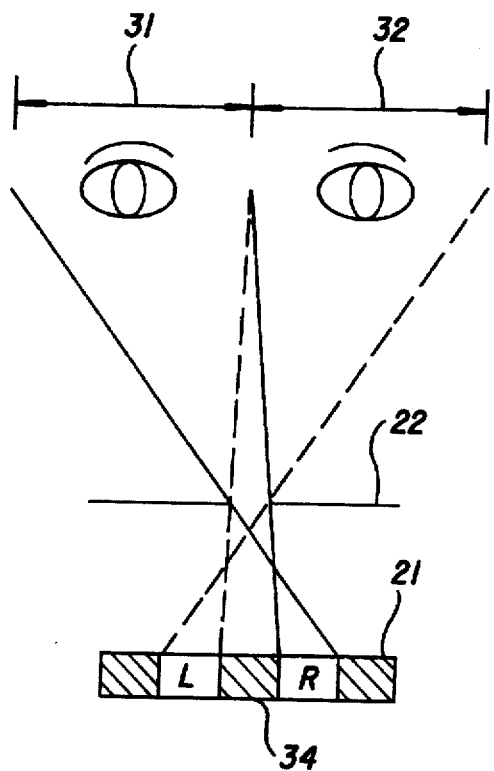
FIG. 16 is a schematic view for explaining a parallax barrier method in the design in which there is no crosstalk region.
Figure 17:
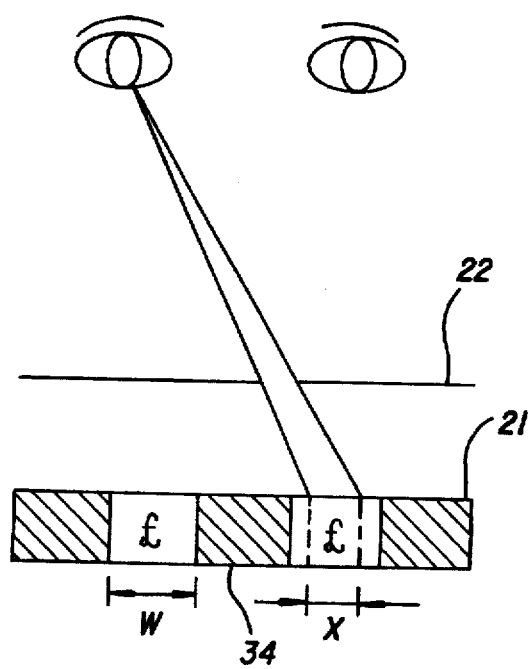
FIG. 17 is a schematic view for explaining brightness in the parallax barrier method.
Figure 18:
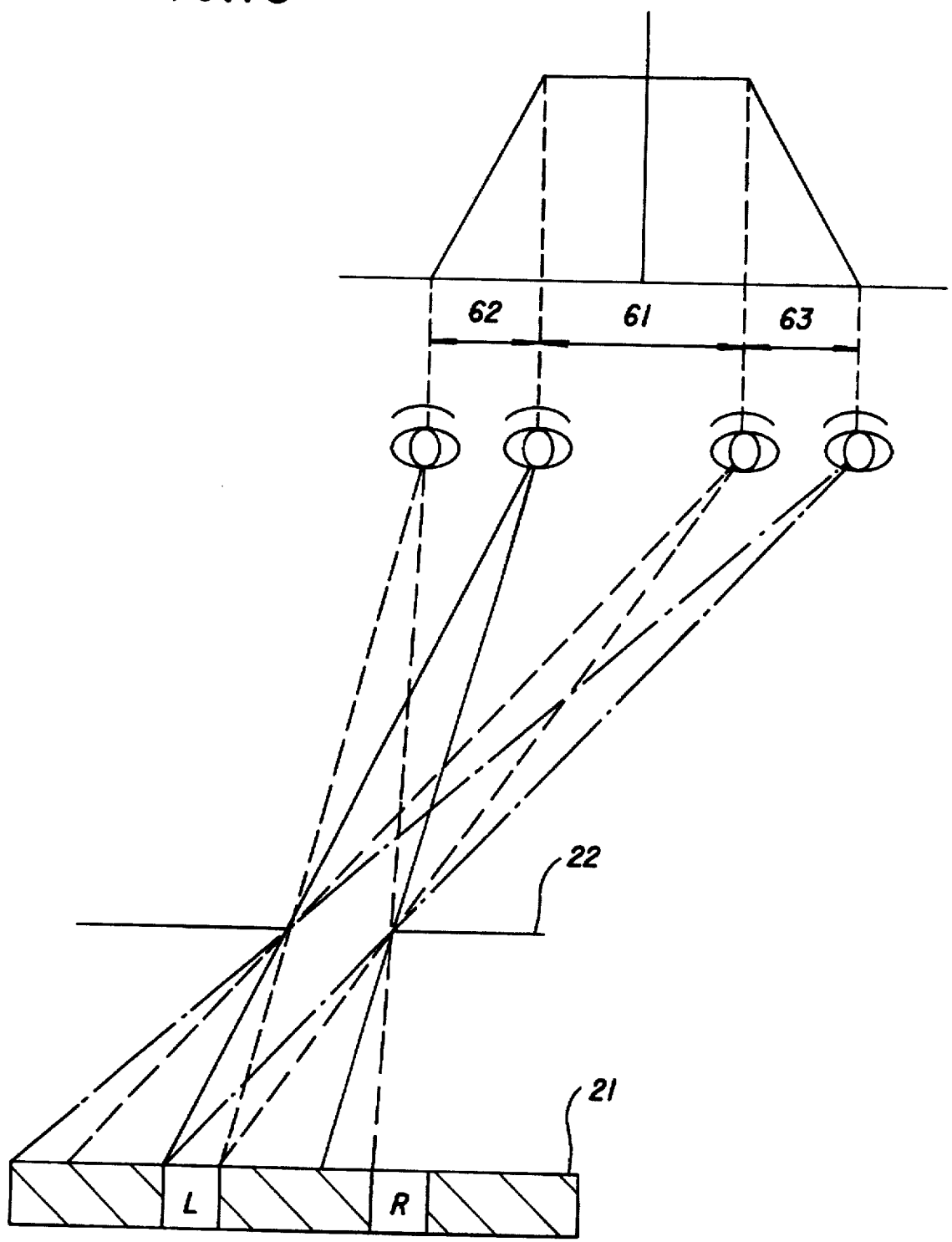
FIG. 18 is a schematic view for explaining brightness per one pixel viewed in consideration of the lateral movement of the position for measurement.

The widths of the pixels on the diffusing plate 30 become constant irrespective of the position of the pixel, as shown in FIG. 13, by thus providing the above described black strips 31 on the diffusing plate 30. Consequently, it is possible to further optimize a parallax barrier 5 for separating an image.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A three-dimensional display comprising:
   an image projector dedicated to a right eye image;
   an image projector dedicated to a left eye image;
   a diffusing plate arranged on a surface on which images respectively projected by the image projectors are formed;
   a parallax barrier having slits in the shape of vertical stripes which is arranged on the side of a viewer with respect to said diffusing plate; and
   a lenticular lens plate arranged on the side of said image projector with respect to said diffusing plate.

2. The three-dimensional display according to claim 1, wherein
said lenticular lens plate comprising multiple continuous semicylindrical lenses longitudinally arranged parallel to each other.

3. The three-dimensional display according to claim 1, wherein
the right eye image and the left eye image respectively projected by said image projector dedicated to a right eye image and said image projector dedicated to a left eye image are formed in the shape of vertical stripes with black portions therebetween on said diffusing plate by the respective lenses constituting said lenticular lens plate.

4. The three-dimensional display according to claim 3, wherein
said parallax barrier is slit at a smaller pitch than the pitch between right eye pixels or left eye pixels which are formed on said diffusing plate, and
the width of each of the slits of the parallax barrier is smaller than the width of each of the black portions.

5. The three-dimensional display according to claim 4, wherein
the image projector dedicated to a right eye image and the image projector dedicated to a left eye image are so arranged such that a first alternate black portion among said right eye pixels and said left eye pixels are wider than a second black portion.

6. The three-dimensional display according to claim 1, wherein
said parallax barrier is constituted by a transmission type liquid crystal element, and
the slits of the parallax barrier are constructed by electronic control.

7. The three-dimensional display according to claim 1, wherein
black stripes having apertures with predetermined spacing formed therebetween are provided at an equal pitch on said diffusing plate.

8. The three-dimensional display according to claim 7, wherein
the width of each of said apertures is not more than the width of a pixel having the smallest width out of the pixels on the diffusing plate, and
all the apertures are so arranged that they are not overlapped with the black stripes on the diffusing plate.

9. A three-dimensional display comprising:
an image projector;
a diffusing plate arranged on a surface on which an image projected by the image projector is formed;
a parallax barrier having slits in the shape of vertical stripes which is arranged on the side of a viewer with respect to said diffusing plate;
a lenticular lens plate arranged on the side of the image projector with respect to said diffusing plate;
wherein said lenticular lens plate comprises multiple continuous semicylindrical lenses longitudinally arranged parallel to each other;
wherein an image projected by said image projector is formed in the shape of vertical stripes with black portions therebetween on said diffusing plate by the respective lenses constituting said lenticular lens plate;
wherein said parallax barrier is slit at a smaller pitch than twice the pitch between the black portions of the image formed on said diffusing plate, and
the width of each of the slits of the parallax barrier is smaller than the width of each of the black portions.

10. A three-dimensional display comprising:
an image projector;
a diffusing plate arranged on a surface on which an image protected by the image projector is formed;
a parallax barrier having slits in the shape of vertical stripes which is arranged on the side of a viewer with respect to said diffusing plate;
a lenticular lens plate arranged on the side of the image projector with respect to said diffusing plate; and
wherein black stripes having apertures with predetermined spacing formed therebetween are further provided at an equal pitch on said diffusing plate.

11. The three-dimensional display according to claim 10 wherein the width of each of said apertures is not more than the width of a pixel having the smallest width out of pixels on the diffusing plate, and
all the apertures are so arranged that they are not overlapped with the black stripes on the diffusing plate.

* * * * *